United States Patent [19]

Haavik

[11] 4,050,851

[45] Sept. 27, 1977

[54] LIQUID RING PUMPS AND COMPRESSORS USING A FERROFLUIDIC RING LIQUID

[75] Inventor: Harold K. Haavik, South Norwalk, Conn.

[73] Assignee: The Nash Engineering Company, Norwalk, Conn.

[21] Appl. No.: 630,845

[22] Filed: Nov. 10, 1975

[51] Int. Cl.² .............................................. F04C 19/00
[52] U.S. Cl. .......................................... 417/68; 210/222
[58] Field of Search .......................... 417/50, 68, 69; 210/222, 223, 416 R

[56] References Cited

U.S. PATENT DOCUMENTS

| | | | |
|---|---|---|---|
| 1,864,640 | 6/1932 | Dalrymple | 417/68 |
| 1,973,019 | 9/1934 | Shore | 417/68 |
| 2,381,700 | 8/1945 | Smith | 417/68 |
| 2,815,003 | 12/1957 | Kumm | 417/68 |
| 3,108,738 | 10/1963 | Luhmann | 417/68 |
| 3,289,918 | 12/1966 | Adams | 417/68 |
| 3,399,134 | 8/1968 | Schouw et al. | 210/223 X |
| 3,642,384 | 2/1972 | Huse | 417/69 X |
| 3,871,176 | 3/1975 | Schukei | 417/50 X |

Primary Examiner—William L. Freeh
Assistant Examiner—Edward Look
Attorney, Agent, or Firm—Nolte and Nolte

[57] ABSTRACT

Liquid ring compressors and pumps using a ferrofluidic ring liquid are disclosed there being electrical coil means disposed around the compressor or pump casing to induce a field in the ferrofluidic ring liquid causing that liquid to form a rotating ring within the casing to drive the rotor.

10 Claims, 11 Drawing Figures

LIQUID RING PUMPS AND COMPRESSORS USING A FERROFLUIDIC RING LIQUID

BACKGROUND OF THE INVENTION

This invention is concerned with liquid ring pumps and compressors. These devices are known per se and comprise basically a rotor having a plurality of longitudinally extending, generally radially disposed vanes which define working chambers or buckets. The rotor is disposed within an eccentric casing and a liquid seal, introduced into the casing, is caused, in known arrangements, by centrifugal force produced by the rotor, to form a ring following the casing. Since the casing is eccentric, the liquid of the ring alternatively advances towards and recedes from the rotor axis to produce a pumping action within the buckets.

The casing may either define a single lobe in which case its inner wall is generally circular and is centered on an axis off-set from that about which the rotor turns so that there be one pumping cycle per revolution of the rotor, or the casing may define plural lobes (generally two lobes) in which there are as many pumping cycles per revolution of the rotor as there are lobes. A typical single lobe pump is that described in U.S. Pat. No. 3,154,240, issued Oct. 27, 1964. A typical multiple lobe pump is shown in U.S. Pat. No. 3,588,283 issued June 28, 1971.

Pumps and compressors of the above types either have a port member disposed in a central eye of the rotor, the rotor having disc-like end shrouds and the port member having passages terminating in ports with which the open, radially inner ends of the buckets are sequentially brought into register; or, they have a radially disposed port plate, the axial ends of the buckets being open and being brought sequentially into register with inlet and outlet ports in the port plate or the rotor may be shrouded with that shroud adjacent the port plate being provided with openings therethrough to register sequentially with the ports of the port plate, or, they have a combination of these two arrangements with one of the outlet and inlet ports being in a radially disposed port plate and the other being disposed in a central port member.

The present invention is applicable to all of these types of pumps and compressors.

One feature which has been common to all of the above types of pumps and compressors has been the inclusion of a shaft secured to the rotor and connected to a motor to impart drive to the rotor. The present invention seeks to provide an alternate means for providing power to the rotor.

BRIEF SUMMARY OF THE INVENTION

According to the present invention, it is proposed that the liquid which forms the ring of the pump or compressor be a ferromagnetic fluid and that there be electrical coil means disposed to induce a field in the fluid to cause that fluid to form a rotating ring around the interior wall of the casing, that ring, by impingement upon the rotor vanes, causing the rotor to turn. An obvious advantage to this arrangement is that one effectively does away with the conventional motor and the coupling between the shaft of the motor and the rotor and, of course, one is able appreciably to reduce the space requirements for the unit. Further, one can eliminate the shaft and bearing assemblies by journalling the rotor, for example, in the casing and of course one can do away with the costly and troublesome stuffing box or other shaft sealing means.

Other advantages and characteristics of the present invention will be apparent from the following description of embodiments of the invention.

DESCRIPTION OF THE PREFERRED EMBODIMENTS

Figure 1:
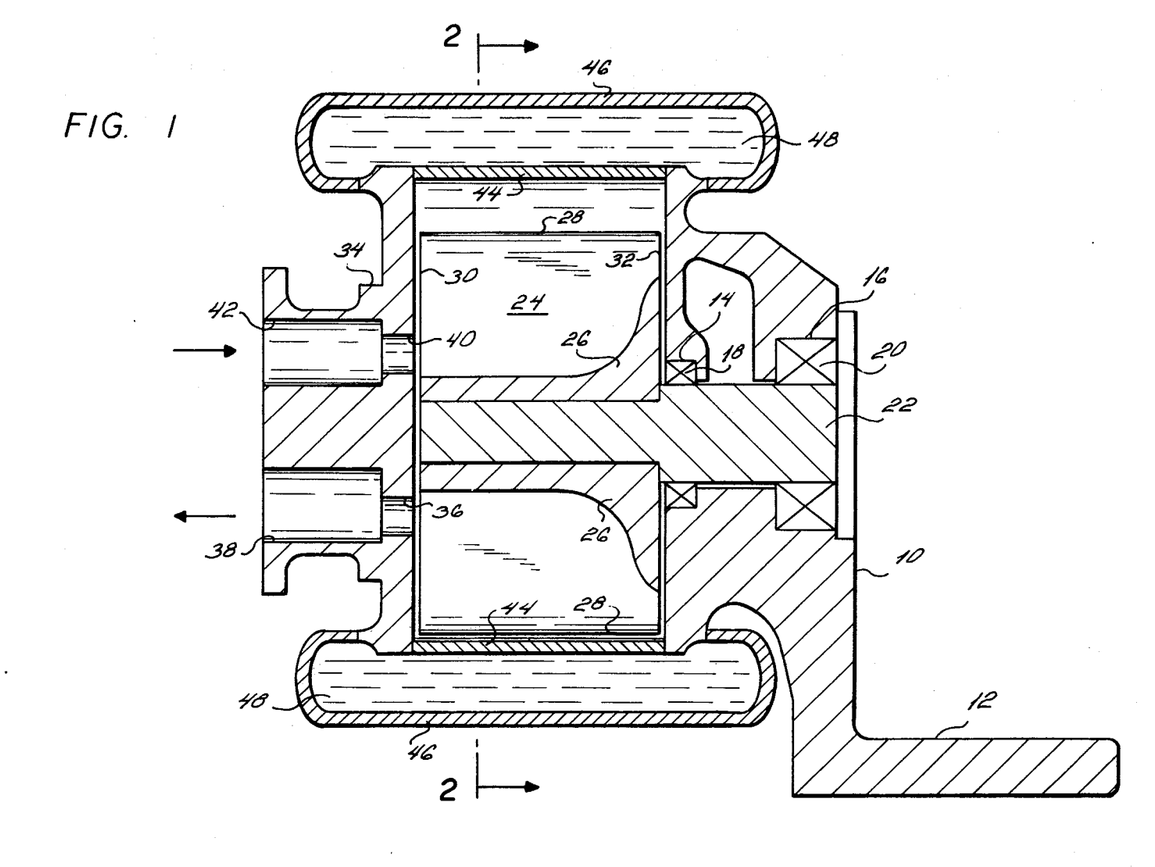
FIG. 1 is an axial cross section of a side port compressor according to the present invention.
Figure 2:
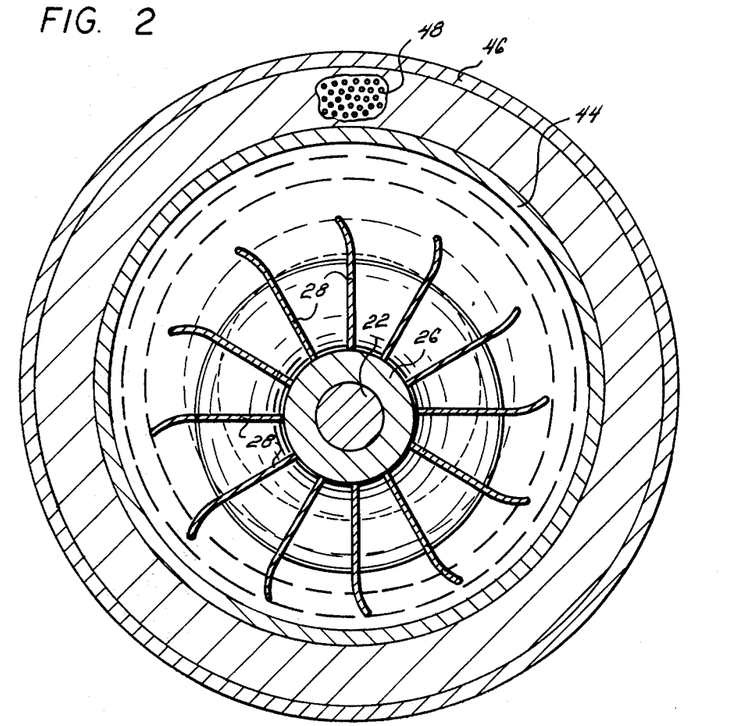
FIG. 2 is a radial cross section of the compressor of FIG. 1.

The unit of FIGS. 1 and 2 is a compressor, although it is to be appreciated that with relatively minor modifications, well within the compass of the average worker in this art, the unit could be utilized as a vacuum pump.

The compressor comprises a bearing support structure 10 with a pedestal part 12, there being formed in the support structure a pair of bearing surfaces 14 and 16 within which bearings 18 and 20 are disposed to support shaft 22. Keyed to shaft 22 is a rotor 24 with a hub 26 and a plurality of generally radial, longitudinally extending vanes 28, the axial edges 30 of which have a running clearance or are in sliding contact with surface 32 of bearing support structure 10 and likewise with the surface of port plate and header structure 34.

At the opposite axial end of the rotor the port plate and header structure 34 is disposed and in that port plate are formed an outlet port 36 leading to discharge passage 38 and an inlet port 40 to which gas to be pumped is delivered along inlet passage 42.

A circular, lobe defining casing 44 is disposed between bearing support structure 10 and port plate/header structure 34 and is centered on an axis offset from that of the shaft 22.

Disposed about the lobe defining casing 44 is an annular coil housing 46 within which windings 48 are disposed, said windings being connected to constitute the coils as the stator winding of a polyphase motor, the rotor of that motor being constituted by a ferromagnetic ring liquid introduced into the lobe defining casing as described hereinafter.

As the coils are excited a field is induced in the liquid within the lobe defining casing and that liquid is caused to form a rotating ring adhering to the interior surface of casing 44. Interaction between the ring and the vanes of the rotor causes the rotor to turn and since the casing and rotor are eccentric the ring will advance towards and recede from the hub of the rotor inducing a pumping action in the buckets of that rotor defined by adjacent vanes, gas being drawn along passage 42 and through port 40 to enter the buckets and exiting through outlet port 36 and along discharge passage 38.

Figure 3:
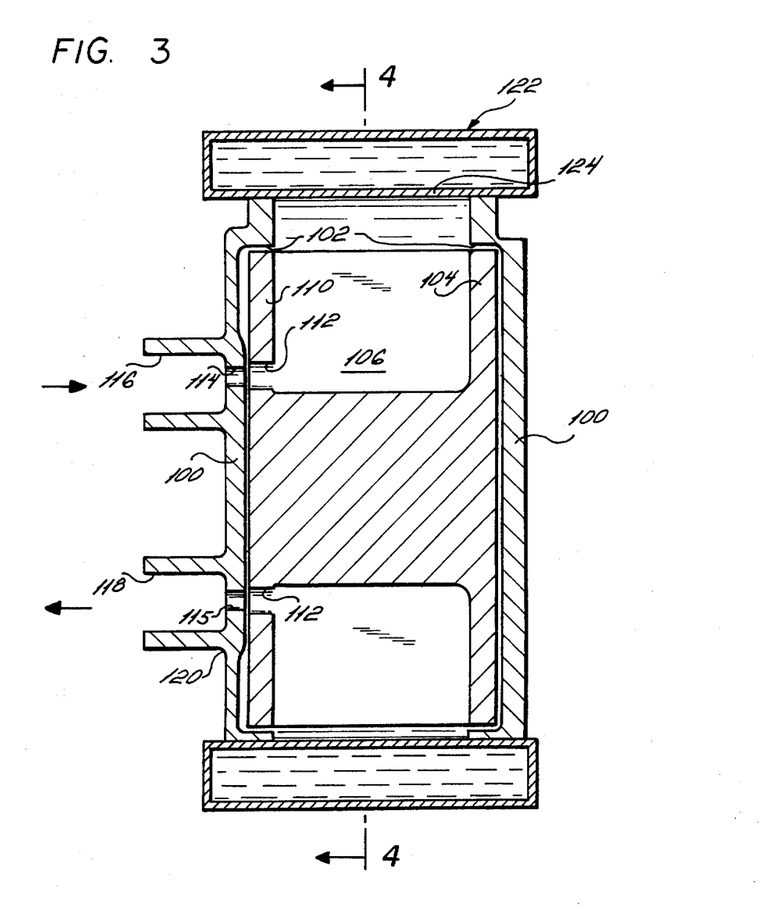
FIG. 3 is an axial cross section of an alternative form of side port compressor according to the present invention.
Figure 4:
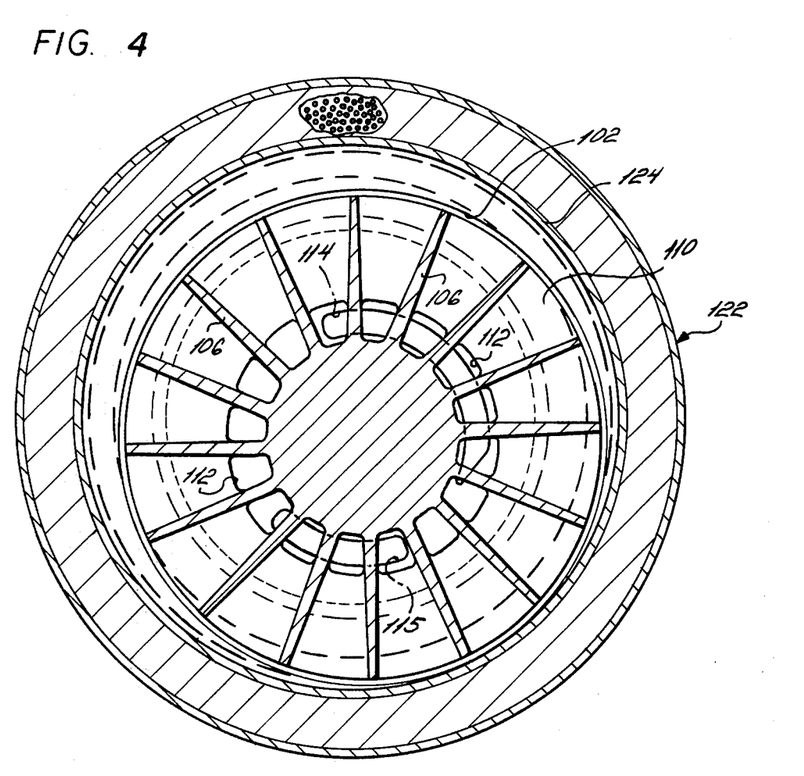
FIG. 4 is a radial cross section of the compressor of FIG. 3.

An alternative form of compressor is illustrated, schematically, in FIGS. 3 and 4. In the embodiement of FIGS. 3 and 4 the end housing walls 100 are each provided with journal or bearing surfaces 102 which cooperate with the outer peripheral surfaces of disc-like shrouds 104 and 110 of rotor 106 so that the rotor may be formed with a solid hub and requires no shaft and associated bearings to support it and of course no shaft seal as in conventional pumps. Shroud 110 is provided with a plurality of openings or ports 112 each of which communicates with a corresponding one of the buckets of the rotor and are sequentially brought into register with inlet-outlet ports 114 and 115 which open to passages 116 and 118, respectively, of a head 120.

Secured to the outer peripheries of elements 100 and 120 is an annular coil housing 122 the inner wall 124 of which defines a lobe which is eccentric to the axis about which the rotor turns.

As in the embodiment of FIGS. 1 and 2, a ferromagnetic liquid is introduced into the interior of the casing defined by surface 124 and housing wall 100, and head 120 and excitation of the coils within housing 122 causes the liquid to form a rotating ring and, through interaction between the liquid of the ring and the vanes of the rotor, causes the rotor to turn and effect a pumping action within the buckets of that rotor.

Figure 5:
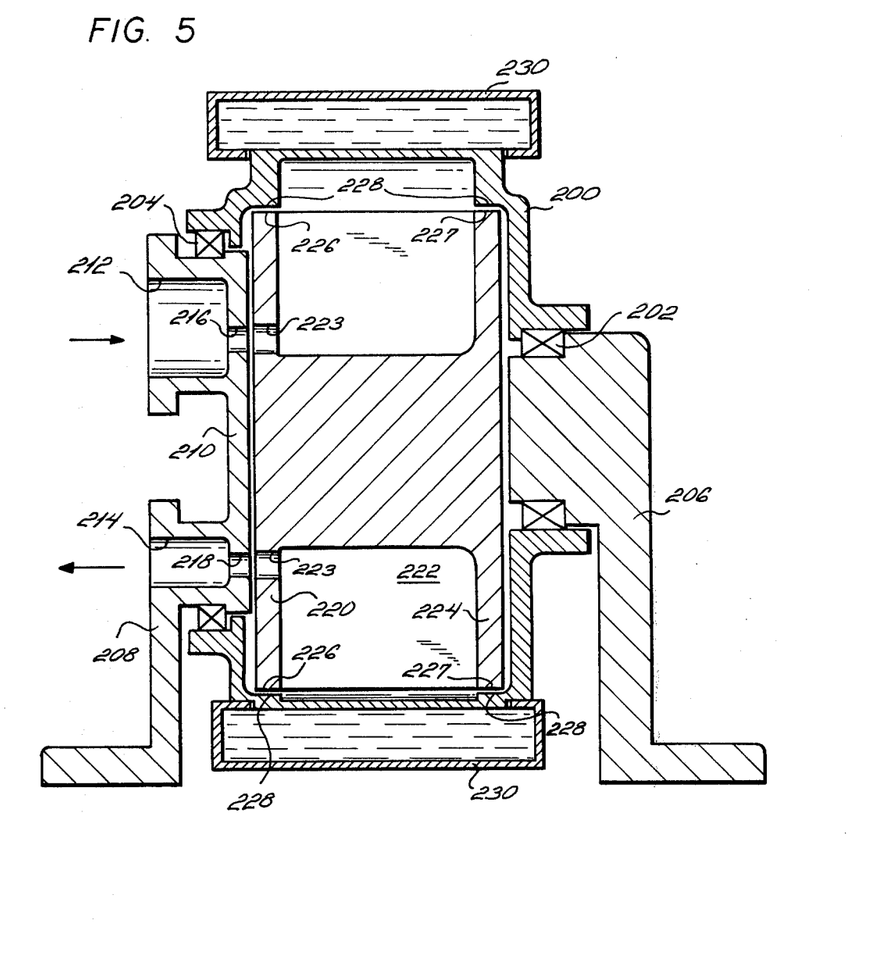
FIG. 5 is an axial cross section of an alternative form of side port compressor according to this invention.

The embodiment of FIG. 5 comprises a unitary casing 200 which is mounted for rotation in bearings 202 and 204, bearing 202 being mounted in a bearing support and pedestal unit 206 and bearing 204 being mounted in a combination head and pedestal structure 208. Thus, the whole housing unit 200 is rotatable.

The head and pedestal structure 208 is provided with an inlet passage 212 and an outlet passage 214, those passages registering with inlet port 216 and outlet port 218, respectively, of a port plate 210 the adjacent shroud 220 of rotor 222 having a plurality of ports or openings 223 which sequentially register with inlet and outlet ports 216 and 218 respectively as the rotor turns. The rotor is provided at its axial end opposite to port plate 210 with another shroud 224 much in the manner of the embodiment of FIGS. 3 and 4 and the outer peripheral edges 226 and 227 of shrouds 220 and 224 respectively are journaled in appropriate journalling surfaces 228 of casing 200. Disposed around the outer periphery of casing 200 is a stationary coil housing 230 containing appropriate windings.

A ferromagnetic ring liquid is introduced into the casing and excitation of the coils within housing 230 induces that liquid to form a rotating ring causing, by interaction with the blades of the rotor, the rotor to turn. It will be appreciated that the casing 200 will also be caused to rotate through frictional forces exerted upon it by the rotating liquid and this of course will appreciably reduce the drag which a stationary casing would exert upon the liquid of the ring.

Figure 6:
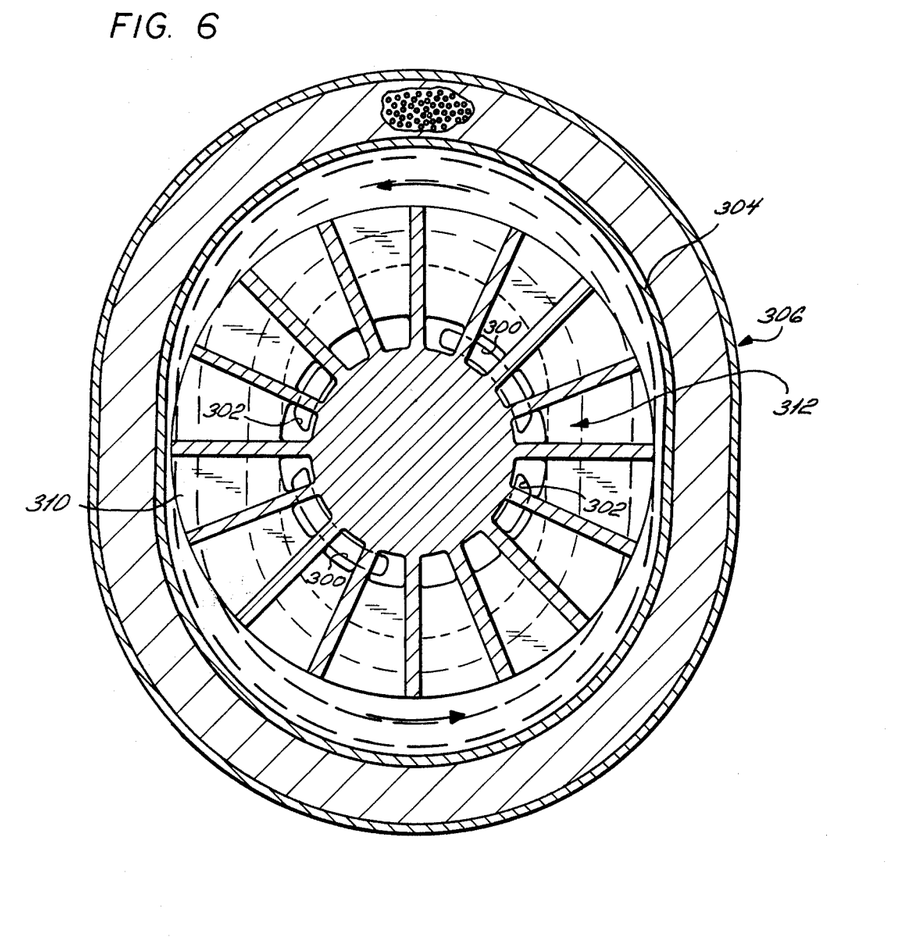
FIG. 6 is a radial cross section of a further form of side port compressor according to this invention.

The embodiment of the invention illustrated in FIG. 6 is of a double lobe side port pump of which a port plate is provided with a pair of inlet ports 300 and a pair of outlet ports 302 with which the ports or openings of shroud 310 of rotor 312 sequentially register as the rotor turns. The inner wall 304 of a coil housing 306 defines a double lobe casing so that as rotor 312 turns two pumping cycles are produced for each revolution.

Figure 7:
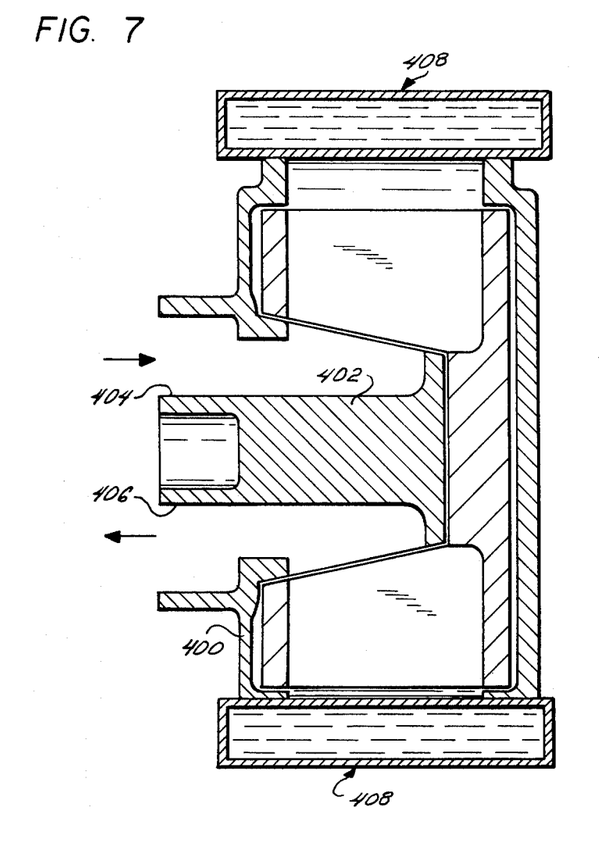
FIG. 7 is an axial cross section of a center port compressor according to this invention.

The compressor of FIG. 7 is of the center port type having a head 400 incorporating an integral, conical port member 402 with inlet and outlet passages 404 and 406 respectively. It should be noted that the inner surface of the coil housing 408 defines the lobe and that the rotor has no shaft but is journaled with the casing as in the embodiment of FIG. 5.

Figure 8:
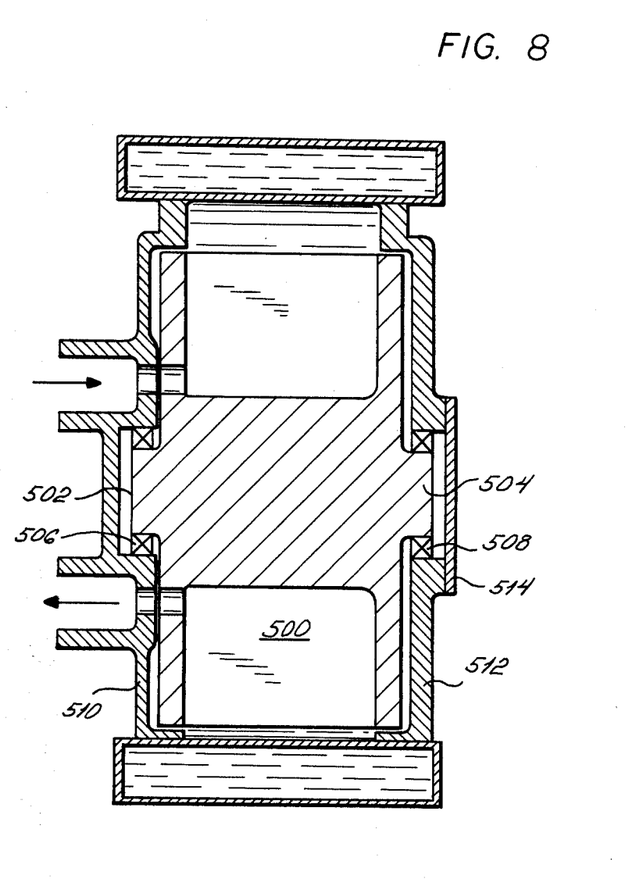
FIG. 8 is an axial cross section of a further alternative compressor according to this invention.

The embodiment of FIG. 8 is generally similar to that in FIG. 3 except that rotor 500 is provided with stubs 502, 504 at each end which are supported in largely conventional bearings 506, 508 received in appropriate bearing bores formed in end walls 510 and 512 of a casing defined by those end walls and by the inner surfaces of a coil housing.

Figure 9:
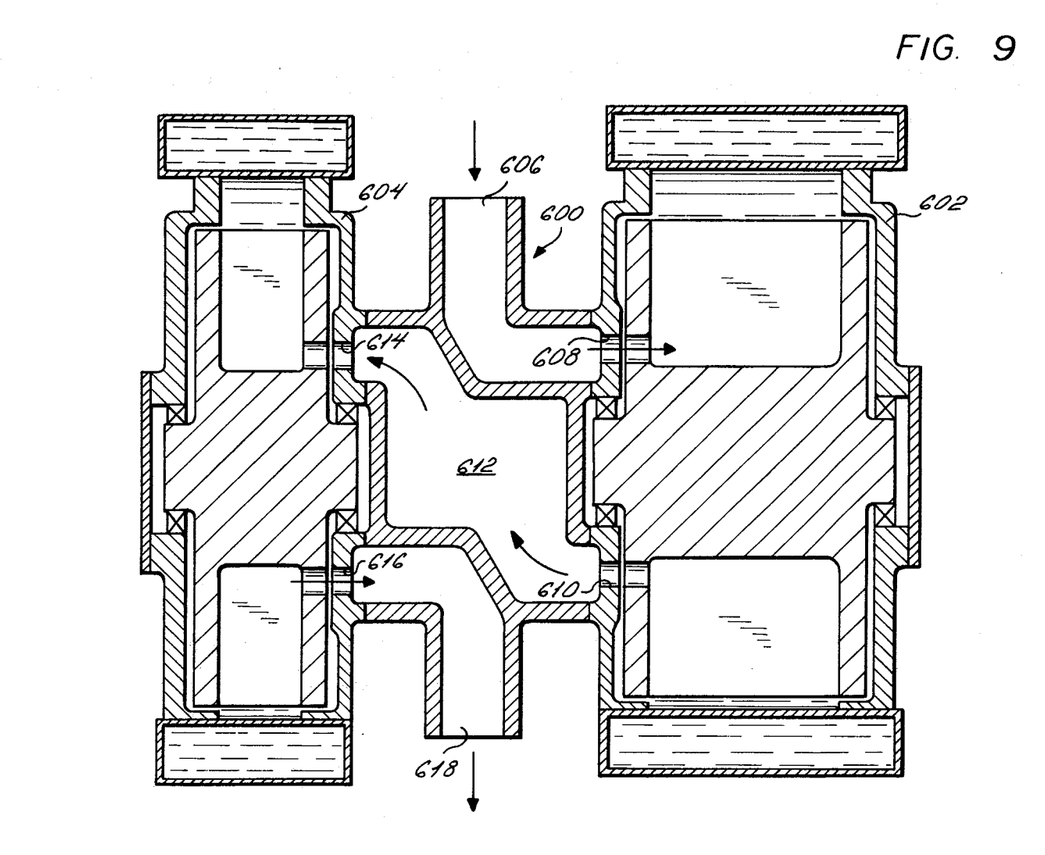
FIG. 9 ia an axial cross section of a two stage compressor according to this invention.

FIG. 9 shows a two stage compressor, each stage being constituted by a compressor similar to that of FIG. 8, those stages being connected through a centrally disposed head indicated generally at 600. Compressor 602 constitutes the first stage of the pump and compressor 604 the second stage. A gas inlet passage 606 is formed in central head 600 and leads, through an inlet port 608, to the rotor buckets of the first stage compressor. From outlet port 610 of the first stage compressor the compressed gas is passed to intermediate passage 612 when it issues to inlet port 614 of second stage compressor 604. After compression in the second stage compressor the gas exits through outlet port 616 to a gas discharge passage 618 of the head to be utilized as required.

The ferromagnetic liquids of the ring of the pumps and compressors of this invention are available from Ferro-Fluidic Corporation of Burlington, Mass. These fluids are essentially colloids of magnetic particles dispersed in a carrier liquid. These liquids are ultra-stable and, as such, the magnetic particles will not settle out of the base liquid under the centrifugal force to which they are subject in the pumps and compressors of the present invention. Additionally, those fluids to be used according to this invention are selected to be inert with regard to the gas to be handled by the pumps and compressors.

The fluids are available in a variety of bases, as, for example, they are available with a diester base, with a hydrocarbon base, with a flurocarbon base, with an ester base, with an aqueous base, with a polyphenyl ether base and with a petroleum base. The particular base to be selected will, of course, depend upon the application and environments of the pump and compressor. Generally, it is considered desirable to select that base which will have a lubricating characteristic. These fluids are described in articles appearing in the February and April 1975 issues of "Mechanical Engineering" and the reader is directed to those publications for further details.

Depending upon the fluid used it may prove desirable or even necessary to ensure that it is not adversely affected by condensate from the medium being handled by the compressor or pump. To do this one may provide any compatible apparatus for drying the medium prior to admission to the pump or compressor, as for example a condenser, one may, where conditions permit, allow the pump or compressor to run hot so as to boil off any liquid component of the medium or one may separate any condensate from the ferromagnetic fluid subsequently to the passage of those materials from the pump or compressor.

It is to be appreciated that the coil windings will be selected according to the input requirement for a particular pump or compressor. The most desirable arrangement will be a polyphase type winding, but it is to be appreciated that a single phase, or even direct current windings would be effective.

It is also to be appreciated that the fluid of the ring is rather expensive and therefore it is necessary to provide means for recovering that part of the ring which would pass through the outlet port with the pumped gas. A separator may be used for this purpose, that separator taking a conventional form such as a standard liquid/gas separator commonly used in this art or, in view of the magnetic character of the fluid, a magnetic separator may be utilized.

Figure 10:
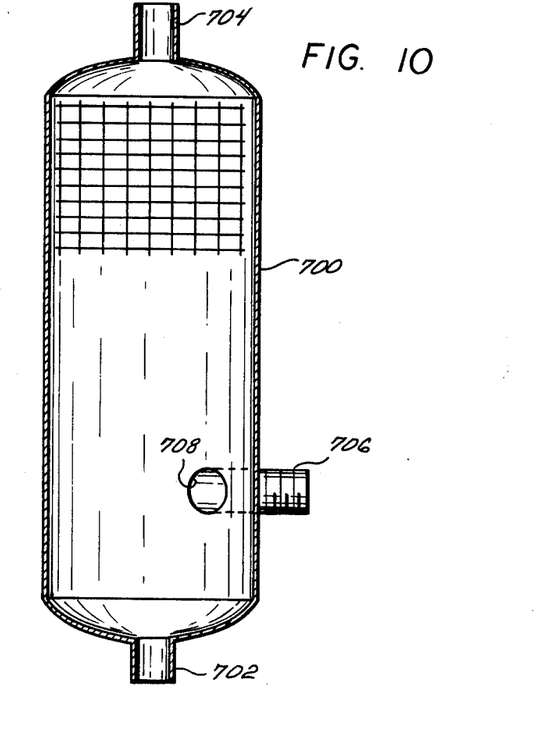
FIGS. 10 and 10A are vertical and horizontal sections, respectively, of a separator useful in the application of this invention.
Figure 10A:
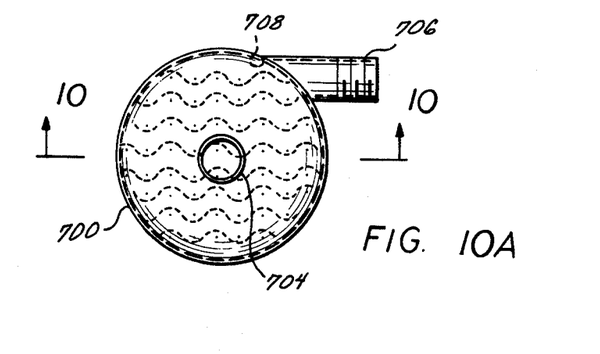

A separator useful with the compressors of the present invention or for that matter in other environments in which it is required to separate a ferromagnetic fluid from a gas is illustrated in FIGS. 10 and 10A.

The separator of FIGS. 10 and 10A comprises a generally cylindrical steel vessel 700 at the lower end of which an outlet 702 is provided for the ferromagnetic fluid and at the upper end of which an outlet 704 is provided for gas.

A generally tangential inlet conduit 706 is provided issuing to the interior of the separator at opening 708. Appropriate means are provided on the ends of conduit 706 for the connection of a source of a mixture of ferromagnetic fluid and gas which is to be separated, as for example the source may be any of the compressors of FIGS. 1 through 9.

The cylindrical wall of container 700, as noted hereabove, is of steel and is magnetized so that the ferromagnetic fluid component of mixtures issuing from opening 708 will, as it is constrained to move around the surface of the cylindrical wall, adhere to that wall. On the other hand, gas will not so adhere and will separate and move upwardly toward gas outlet 704. As the film of ferromagnetic fluid adheres to the steel wall of the vessel it becomes thicker so that gravity will cause it to move from that wall downwardly towards fluid discharge 702 to be reused as, for example, to be recirculated to a compressor. Disposed above the inlet opening 708 and close to the upper end of vessel 700 is a reticulate structure 710 which is magnetizable and in the particular embodiment illustrated is formed of steel mesh. This structure is effective to remove the ferromagnetic liquid content of any mist which may otherwise pass to the gas outlet and be lost. The fineness of the mesh and the spacing between the screens is determined by the density of the ferromagnetic fluid by its viscosity and by the gas velocity. The fineness of the mesh and the spacing between the screens also determine the degree of separation. It will be appreciated that the ferromagnetic fluid content of any mist reaching the screens will be separated from the gas component which will, of course, pass through the screens.

What is claimed is:

1. A liquid ring pump or compressor comprising a casing, a rotor mounted for rotation within said casing and defining, at least in part, a plurality of working chambers, port means through which a pumped medium is admitted to and discharged from said chambers, said casing including at least a portion eccentric to said rotor, a quantity of ferromagnetic liquid within said chamber whereby, upon rotation of said rotor, said chambers are caused alternately to expand and contract, electrical coil means disposed to induce a field within said casing to cause said ferromagnetic liquid to form a rotating ring, impingement of said ring on said rotor causing the rotor to turn, said coil means and liquid together constituting electrical motor means of which said liquid constitutes a rotor.

2. Apparatus as claimed in claim 1 wherein said coil means is annular in form and disposed about said casing.

3. Apparatus as claimed in claim 1 wherein said coil means comprises an annular housing, an inner surface of said housing defining a part of said casing including a portion eccentric to said rotor.

4. Apparatus as claimed in claim 1 wherein said casing is circular and is mounted for rotation.

5. Apparatus as claimed in claim 1 wherein said rotor comprises a solid hub and includes a journalling surface for cooperation with a corresponding surface of said casing for supporting said rotor for turning movement within said casing.

6. Apparatus as claimed in claim 1 wherein port means through which a pumped medium is discharged is connected to a separator, said separator including a magnetized structure upon which a ferromagnetic liquid passing through said port means is caused to impinge.

7. Apparatus as claimed in claim 6 wherein said separator comprises a vessel, magnetized means within said vessel, an inlet for ferromagnetic liquid and gas to said vessel, means causing a mixture of ferromagnetic liquid and gas admitted to said vessel to impinge on said magnetic means, an outlet for said ferromagnetic liquid disposed towards the lower end of said vessel and an outlet for a gas disposed above said magnetic means.

8. Apparatus as claimed in claim 7 wherein said magnetized means comprises a shell defining, at least in part, said vessel.

9. Apparatus as claimed in claim 8 further including a magnetized and reticulate structure disposed between said inlet and said gas outlet.

10. Apparatus as claimed in claim 7 wherein said magnetized means comprises a reticulate structure disposed between said inlet and said gas outlet.

* * * * *